(No Model.)  2 Sheets—Sheet 1.
W. B. FARWELL.
Corn Husker.
No. 230,183.  Patented July 20, 1880.
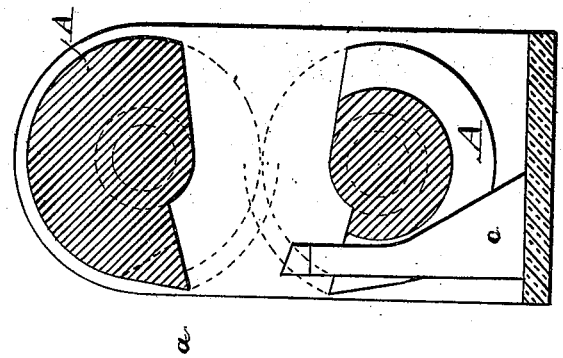
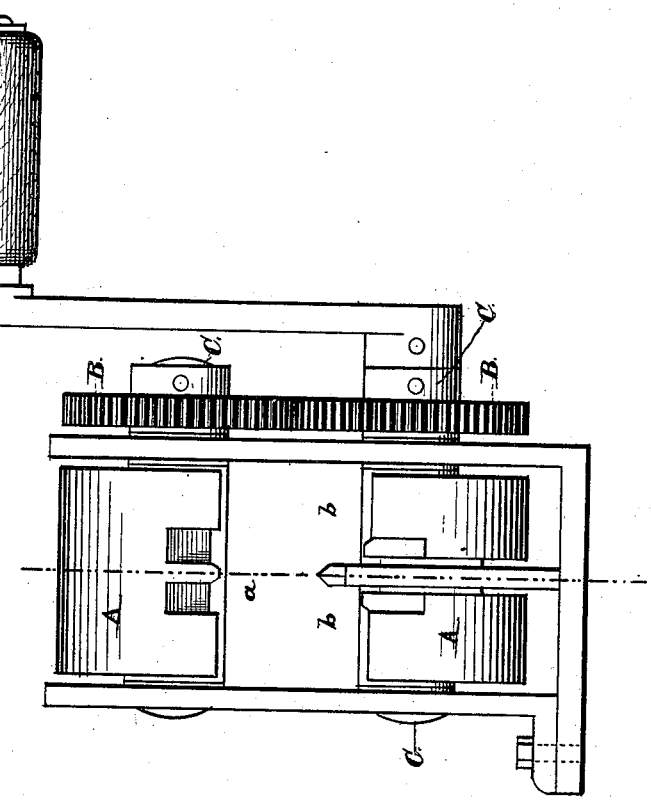
Witnesses.  Inventor.
Leonard E. Curtis  Willard B. Farwell
Harry Overington (No Model.)  2 Sheets—Sheet 2.
W. B. FARWELL.
Corn Husker.
No. 230,183.  Patented July 20, 1880.
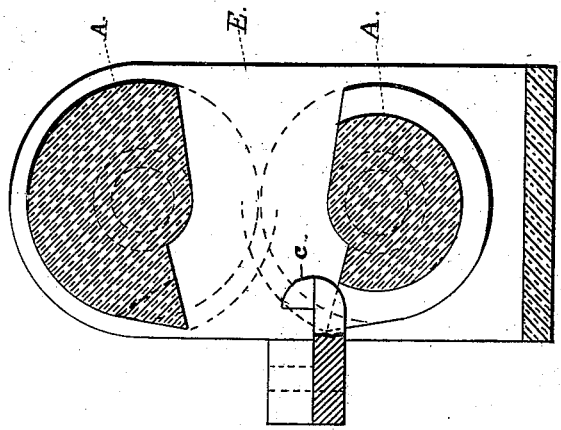
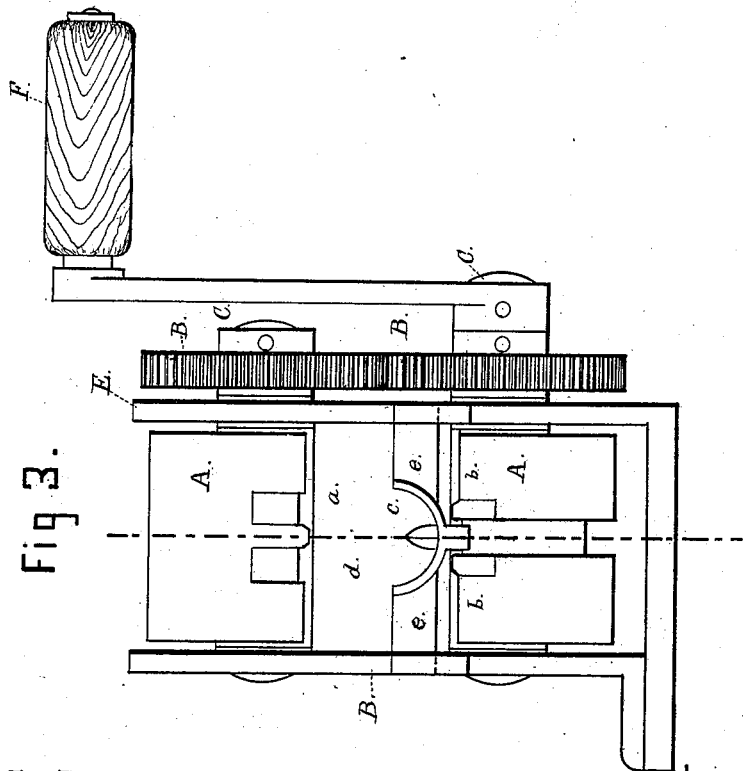
Witnesses.  Inventor.

UNITED STATES PATENT OFFICE.

WILLARD B. FARWELL, OF NEW YORK, N. Y.

CORN-HUSKER.

SPECIFICATION forming part of Letters Patent No. 230,183, dated July 20, 1880.

Application filed April 8, 1880. (No model.)

*To all whom it may concern:*

Be it known that I, WILLARD B. FARWELL, of the city and county of New York, in the State of New York, have invented a new and useful Improvement in Corn-Huskers, of which the following is a specification, reference being had to the accompanying drawings, which form a part hereof.

My invention relates to, and is especially an improvement upon, the corn-husker invented by me, and described in Letters Patent No. 224,588, granted to Stephen G. Clarke as my assignee.

My present improvement upon said invention consists, first, in providing a device to be attached to and to form part of said corn-husker, whereby the butt-end of the unhusked ear of corn can be readily presented at each revolution of the husking-cams at exactly the right point, so as to avoid the possibility of the cams grasping the ear either too far up the cob from the base of the ear or not far enough to separate the husk fairly from the cob; second, in so constructing the teeth of the cams, in combination with said first-mentioned device, as to prevent the butt of the unhusked ear from being drawn in and crushed between the rolling-surfaces of the cams before the butt of the ear to which the husk is attached is bitten off and separated from the ear of corn preparatory to being stripped from the ear and drawn through the cams.

In the drawings, Figure 1 is a front view, and Fig. 2 a transverse section, of my machine as constructed with the improvements described in this specification. Figs. 3 and 4 are similar views of the same constructed in a slightly modified form.

Like letters of reference refer to like parts in all the figures.

A A are the rollers or cams. B B are the gear-wheels, and C C are the shafts upon which they are hung. F is the crank, and E E the frame, of the machine. *a* is the blunt tooth, designed to bite off the husk and stalk at the base of the ear, in the upper cam, and *b b* are the corresponding teeth in the lower cam. *c* is a pointed stud, fastened to the lower part of the frame and standing with its upper end just in front of the rollers, where the ears of corn are introduced. Room for it is provided by cutting a groove in the lower cam. This stud is pointed at the top and brought to a knife-edge in front, and it acts as a stop for the unhusked ear of corn, so as to prevent it from being thrust too far in between the cams or rollers.

This construction may be somewhat modified, as shown in Figs. 3 and 4, by attaching the stud *c* to a cross-piece, *e e*, instead of the lower part of the frame. In that case the stud is made somewhat in the form of a hook, as shown in Fig. 4, and the middle part of the cross-piece is made in the form of a short trough to receive the ears of corn.

The operation of the machine is mainly as described in the Letters Patent above referred to, except that the operator thrusts the butt of the unhusked ear sharply against the end of the stud *c* as he introduces it between the cams, and the point of the stud enters the husk at the rear end of the ear and stops the ear at exactly the right point to enable the biting-teeth of the cams to grasp the husk at the base of the ear, just forward of the point where the husk joins the stalk, and separate it at that point.

The biting-teeth are so constructed as to stand out at a slight angle from the circumferential line of the rollers or cams, and thereby, as the rollers revolve, they tend to push back the ear from out of the husk, and so prevent the rolling-surfaces from taking hold of and crushing the butt of the smaller ears, which, without the upright stud and this mode of constructing the teeth, might sometimes be liable to be drawn in between the rollers.

Having described my invention, what I claim as new, and desire to secure by Letters Patent, is—

1. The combination, in a corn-husking machine, of the stud *c* with two rollers or cams provided with teeth for removing the husks from the ear, substantially as described.

2. The combination, in a corn-husking machine, of the stud *c* with the rollers or cams A A, each of said rollers being provided with teeth *a a* projecting at a slight angle outside of the line of its circumference, substantially as described.

3. In a corn-husking machine, a pair of rollers or cams constructed in the form of flattened cylinders, and each provided with teeth projecting in the direction of revolution at a slight angle outside of the line of the circumference, substantially as described.

WILLARD B. FARWELL.

Witnesses:
MELVIN BROWN,
CLARKSON A. COLLINS.